Figure 1:
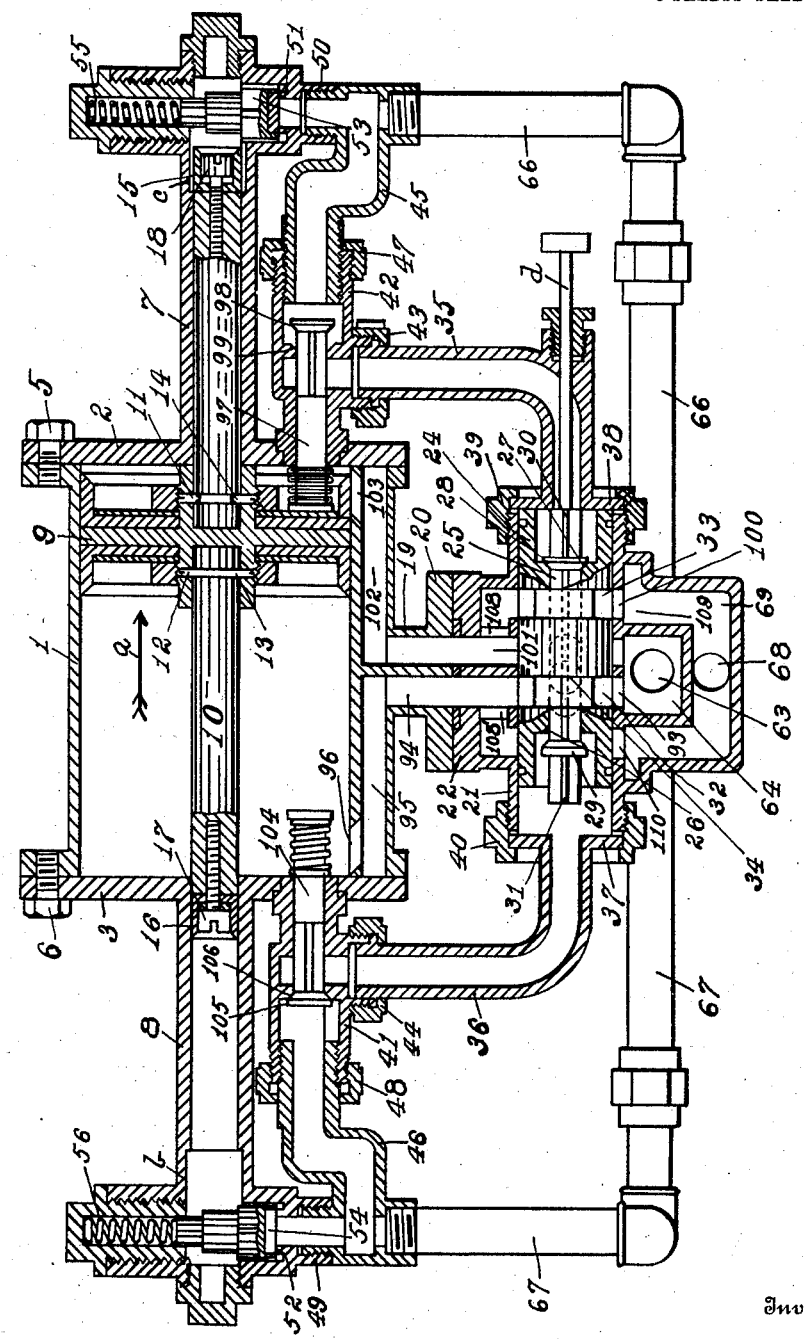

F. SCHREIDT.
TESTING APPARATUS.
APPLICATION FILED OCT. 24, 1908.

1,025,163.

Patented May 7, 1912.
5 SHEETS—SHEET 1.

Witnesses
Fred. A. Schlosser.
Pearl Schumann

Inventor
Frank Schreidt
By John H. Boss
his Attorney

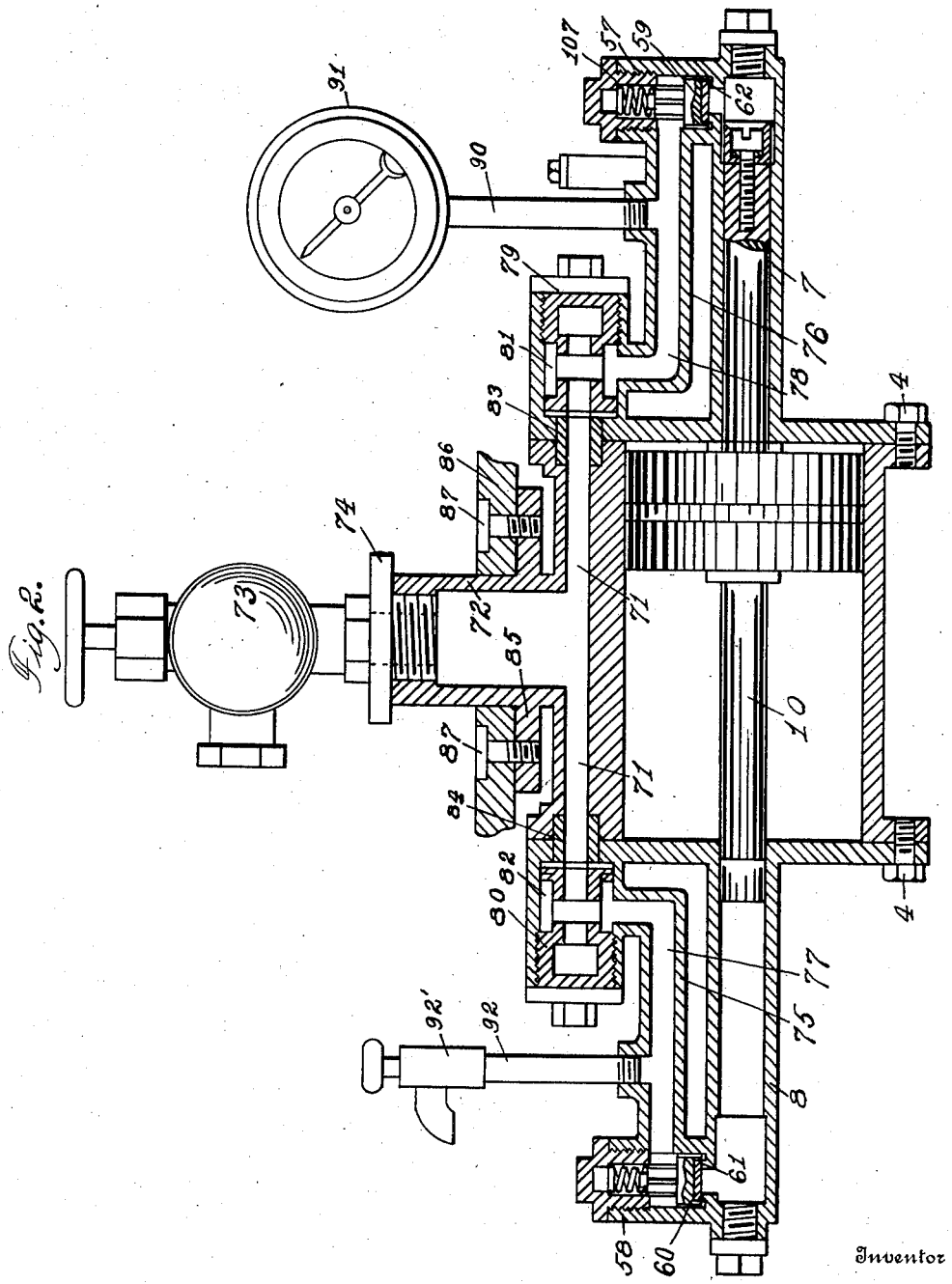

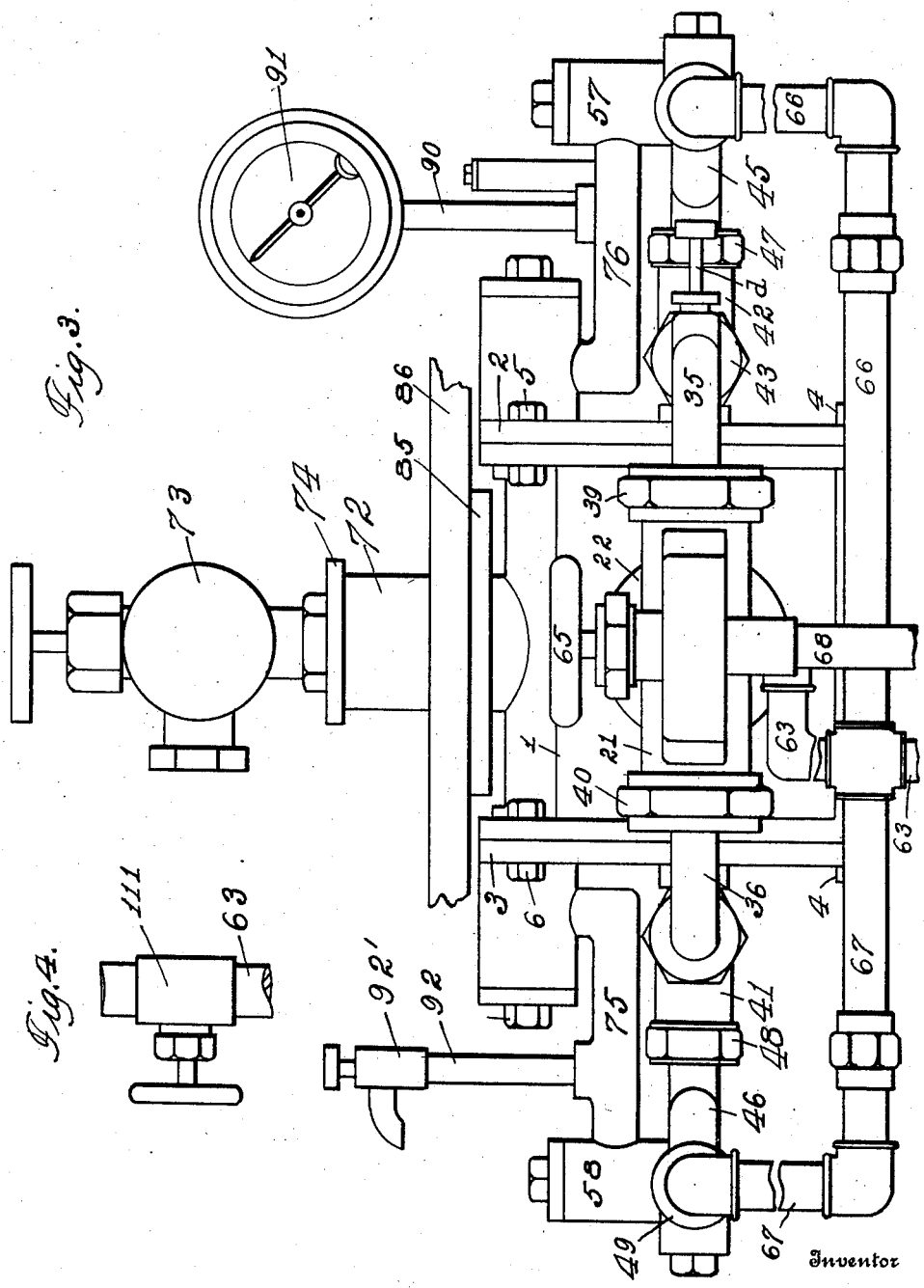

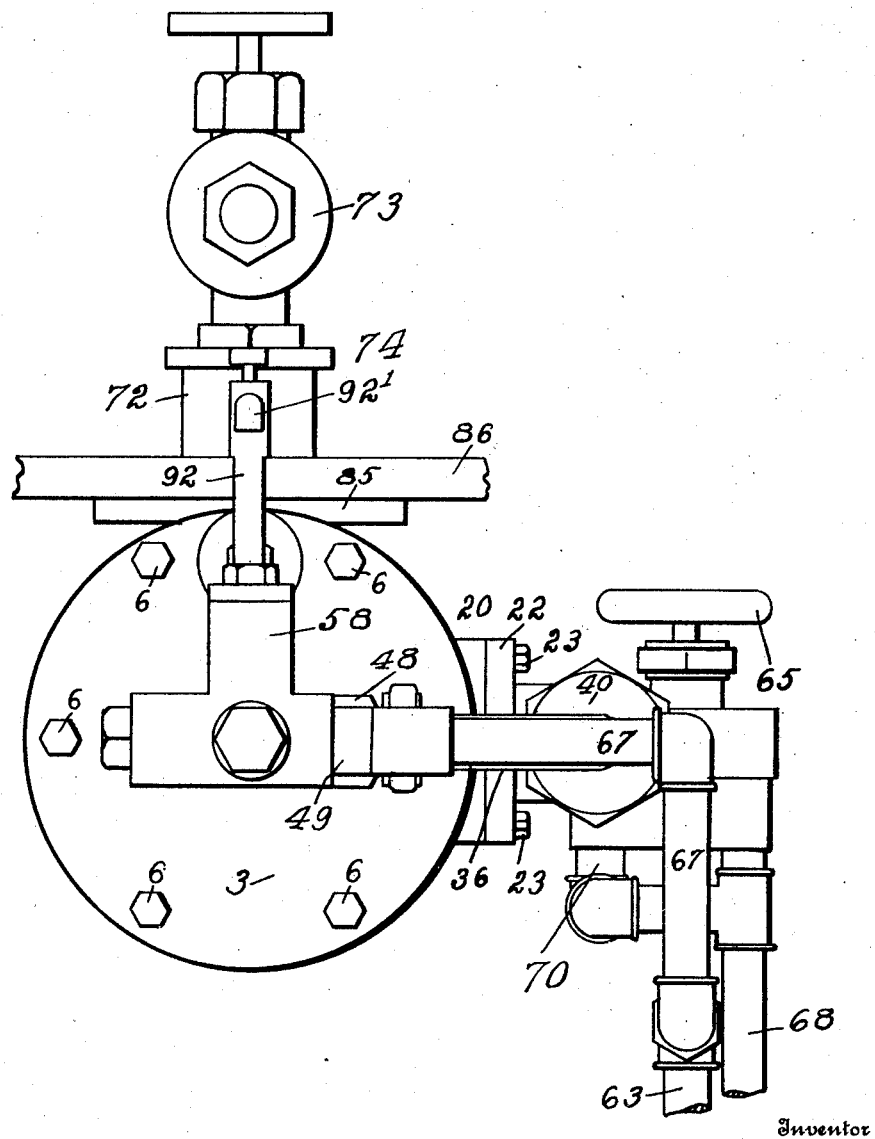

F. SCHREIDT.
TESTING APPARATUS.
APPLICATION FILED OCT. 24, 1908.
1,025,163.
Patented May 7, 1912.
5 SHEETS—SHEET 5.
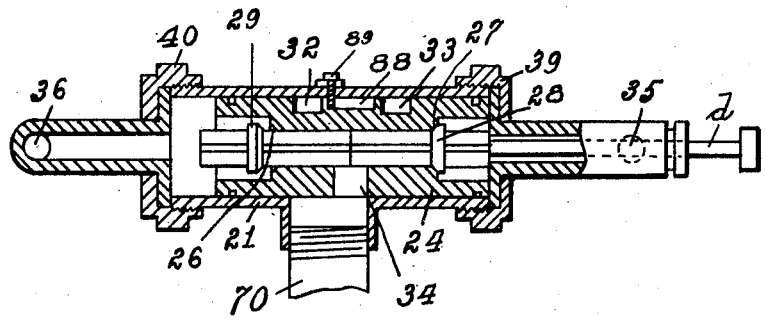
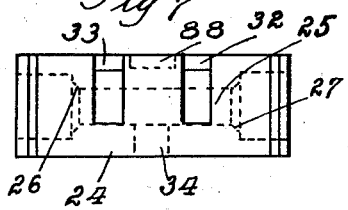
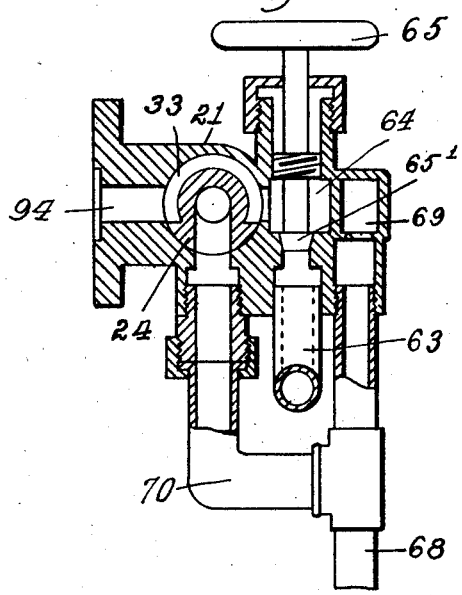
Witnesses
Fred A. Schlosser.
Pearl Ackerman
Inventor
Frank Schreidt
By John H. Coss
his Attorney

UNITED STATES PATENT OFFICE.

FRANK SCHREIDT, OF MANSFIELD, OHIO.

TESTING APPARATUS.

1,025,163.  Specification of Letters Patent.  Patented May 7, 1912.

Application filed October 24, 1908. Serial No. 459,387.

*To all whom it may concern:*

Be it known that I, FRANK SCHREIDT, a citizen of the United States of America, residing at Mansfield, in the county of Richland and State of Ohio, have invented certain new and useful Improvements in Testing Apparatus, of which the following is a specification.

My invention relates to a testing apparatus and consists in improvements of Patent No. 909,950, bearing date of January 19, 1909.

One of the objects of my invention is to provide a testing apparatus that is automatic in action and does not require hand manipulation of any of the parts to put the testing apparatus in proper condition to continue the testing of more than one article.

The essential feature of my invention is to provide a testing apparatus that will automatically adjust itself after the removal of the article last tested to perform the testing function on the next article that is desired to be tested without any hand manipulation on the part of the operator.

It further consists in the construction and arrangements of parts hereinafter described in the specification and specifically pointed out in the claims.

I attain these and other objects by the mechanism illustrated in the accompanying drawing in which:

Figure 1 is a longitudinal sectional view of my testing apparatus. Fig. 2 is a vertical sectional view of my testing apparatus showing pressure gage, relief valve, and valve attached to the testing apparatus for testing purposes. Fig. 3 is a vertical side elevation of my testing apparatus. Fig. 4 is a view of a section of the inlet pipe showing a valve secured thereto for the purpose of cutting off the water supply. Fig. 5 is an end elevation of my testing apparatus. Fig. 6 is a longitudinal sectional view of the sliding valve and cylinder taken through the center. Fig. 7 is a detail view of the sliding valve. Fig. 8 is a sectional end elevation of the sliding valve, cylinder, pressure regulating valve and inlet and outlet pipes.

The similar reference characters refer to similar parts throughout the several views.

Referring to the drawings, 1 designates a low pressure cylinder. Upon each end of the low pressure cylinder, cylinder heads 2 and 3 are secured by the bolts 4, 5 and 6. High pressure cylinders 7 and 8 are attached to or made integral with the cylindrical heads 2 and 3. A piston 9 is fitted to reciprocate within the inner periphery of the low pressure cylinder 1 and is securely attached to a piston rod 10 through the medium of set screws 11 and 12 which pass through the hub of the piston into annular grooves 13 and 14 formed in the piston rod 10.

Pistons 15 and 16 are attached to the extremities of the piston rod 10 by the bolts 17 and 18. It will be observed that the low pressure cylinder 1 and high pressure cylinders 7 and 8 are in axial alinement with each other and that the pistons 9, 15 and 16 are all secured to the piston rod 10 so that when movement is imparted to the piston rod 10 all of the pistons move in unison.

An outwardly extending tubular portion 19 having a flange 20 is provided on the cylinder 1. A valve casing 21 having a projecting portion 22 is provided and securely attached to the flange 20 of the tubular projecting portion 19 by the bolts 23. A sliding piston valve 24 is fitted to reciprocate in the casing 21 and is provided with a central aperture 25.

The extremities of the sliding piston valve are formed cup shaped and valve seats 26 and 27 are formed surrounding the aperture. Two valves 28 and 29 are fitted to the central aperture 25 of the sliding piston valve and are adapted to seat on the valve seats 26 and 27. Winged portions 30 and 31 are provided on the valves 28 and 29 and when either of the valves are seated extend flush with the extremities of the sliding piston valve. The sliding piston valve 24 is provided with two segmental ports 32 and 33. These ports are formed at right angles to the length of the sliding piston valve 24. An aperture 34 is provided in the sliding piston valve 24 and intersects the aperture 25. This provides communication from each end of the sliding piston valve through the central aperture 25 to the intersecting aperture 34. Pipes 35 and 36 provided with flanges 37 and 38 which are adapted to contact with the extremities of the casing 21 are provided and held in place by the gland nuts 39 and 40 which engage with the screw-threaded outer periphery of the ends of the casing as shown in Fig. 1. The opposite ends of the pipes 35 and 36 enter the inner periphery of a boss formed on the valve casing 41 and 42 and are held in place by the gland nuts 43 and 44. Elbow joints 45 and 46 are connected to the end of the valve casings 41 and 42 by the gland nuts 47 and 48 and the opposite ends are fitted to the valve casings 49 and 50 which are made integral with high pressure cylinders 7 and 8.

Valve seats 51 and 52 are formed in the casings and valves 53 and 54 are provided and adapted to contact therewith. Coil springs 55 and 56 of light tension exert a pressure against the valves 53 and 54 to hold them in contact with their respective seats. Referring now to Fig. 2, valve casings 57 and 58 are also formed on the end of each high pressure cylinder 7 and 8 and extend upwardly at right angles with the valve casings 49 and 50 (see Fig. 1). Check valves 59 and 60 are fitted in the valve casings 57 and 58 and are adapted to contact with the seats 61 and 62 as shown clearly in Fig. 2.

Referring now to Figs. 1 and 8, an inlet supply pipe 63 is connected to the chamber 64 of the regulating valve 65 and supplies the live water that operates the testing apparatus. Branch pipes 66 and 67 are connected to the inlet pipe 63 on one end and the opposite end is connected to the elbows 45 and 46. This provides a passage-way for the live water through the pipes 66 and 67 to the elbows 45 and 46.

Referring now to Fig. 1, an exhaust or waste water pipe 68 is connected to the exhaust chamber 69 and the branch line pipe 70 (see Fig. 8), is connected to the pipe 68 and to the lower portion of the cylindrical casing 21. (See Fig. 8.) Ports or passageways 71 are provided on the low pressure cylinder 1 and they communicate with the annular up-standing tubular portion 72 which is interiorly screw-threaded to provide means of attaching a valve 73 or the like to the upper end so that it can be tested to the required pressure. A bushing 74 is provided and made to conform to the threaded portion of any article that it is desired to test; in other words, it provides a connecting means to connect the article to be tested to the testing apparatus. In the tubular portions 75 and 76 which are formed on the cylinder heads 2 and 3, passage ways 77 and 78 are formed communicating with the passage way 71. In the upper portion of the tubular portions 75 and 76 and in line with the passage way 71, screw-threaded plugs 79 and 80 are provided forming a closure for the chambers 81 and 82. The screw-threaded plugs 79 and 80 have an annular groove formed on the periphery thereof which provides the chambers 81 and 82. Bushings 83 and 84 are used to connect the cylinder heads 2 and 3 to the low pressure cylinder. (See Fig. 2.) An annular outwardly extending flange 85 is provided on the portion 72 and provides a means of attaching the testing apparatus to a bench 86 through the medium of bolts 87.

Referring now to Fig. 6, a slot 88 is formed in the upper portion of the sliding valve and a guide screw 89 is fitted to a screw-threaded aperture in the upper portion of the casing 2 leaving the end depending into the slot so that when the piston valve reciprocates in the cylinder it is prevented from turning within the casing. A pipe 90 is fitted to the tubular portion 76 and communicates with the passage 78. Upon the upper end of the pipe 90 a pressure gage 91 is fitted so as to indicate the pressure carried within the cylinders of the testing apparatus. A pipe 92 is fitted to the tubular portion 75 of the cylinder head and communicates with the passage-way 77. To the upper portion of the pipe 92 a relief valve 92' is attached for the purpose of relieving the pressure of the testing apparatus if so desired.

The above describes the structural features of my testing apparatus and the means of connecting them together.

I will now describe the operation of the testing apparatus. The pipe 63 is connected to city water mains or other source of supply and the water or other fluid at initial pressure passes through the pipe 63 and past the valve 65' (when it is open) into the chamber 64. (See Fig. 1.) In order to force the piston 9 to the end of its stroke as shown in Fig. 1, the sliding piston valve 24 must be placed in the position shown in Fig. 1. In this position the segmental groove 32 of the piston will be in exact alinement with the port 94 which in turn communicates with the port 95 from which port it passes through the aperture 96 into the cylinder 1. The pressure of the water is then exerted against the piston 9 forcing it in the direction of the arrow (a) to the end of its stroke. When the piston 9 approaches the end of the stroke it comes in contact with the valve stem 97 which in turn forces the valve 98 from its seat 99. This permits the water at city pressure to pass through the pipe 66 and past the valve 98 into the pipe 35 exerting its pressure against the valve 28 closing it and forcing the sliding piston valve 24 toward the opposite end of the cylinder and bringing the segmental port 33 in line with the port 101 from whence it passes to the port 102 through the aperture 103 into the cylinder 1 and forces the piston 9 on its return stroke until it contacts with the end of the valve stem 104 releasing the valve 105 from its seat 106 and permitting the water to pass under pressure from the pipe 67 through the pipe 36 and forcing the sliding piston valve 24 on its return stroke. This operation is repeated continually during the time that the testing apparatus is being used.

The water that accumulates in the casing of the sliding piston passes out through the aperture 25 thence through the aperture 34 into the branch exhaust pipe 70 and thence into the exhaust pipe 68. The branch inlet pipes 66 and 67 are continually filled with live water from the mains or other source of supply and pass up through the valves 53 and 54 and exert a pressure against the pistons 15 and 16. When the piston 9 is going in the direction indicated by the arrow $a$ the piston 15 forces the water against the valve 59 which raises it from its seat against the coil spring 107, thence it passes through the passage way 78 into the passage way 71 and against the valve or other article 73 that it is desired to test and at the same time the water or other liquid is forced into the pipes 90 and 92 against the pressure gage 91 and release valve 92'.

The pressure gage indicates the pressure of the water and the force that it exerts against the article that it is desired to test. The relief valve 92' is for the purpose of relieving the pressure that is exerted against the article that it is desired to test so as to bring it down to a pre-determined amount if desired. The regulating valve, however, for regulating the pressure in the testing apparatus is the valve designated 65. The pressure within the testing apparatus can be varied by opening the valve 65 more or less which increases or decreases the pressure exerted against the article to be tested. The pressure can be regulated as stated before to a predetermined amount by opening the valve 65 to conform to the pressure desired.

When the piston 9 approaches the end of its stroke as shown in Fig. 1, the water that has accumulated in the cylinder 1 is forced out through the aperture 103 into the passage ways 102 and 101; thence to the exhaust port 108'; thence through the segmental port 33 into the exhaust chamber 109 and out through the exhaust or waste water pipe 68. The same action takes place when the piston reaches the opposite end of its stroke, the water passing out of the aperture 96 into the passage-way 95; thence to the passage-way 94; thence through the exhaust port 108; thence through the segmental port 32 through the exhaust aperture 110 and out through the exhaust or waste pipe 68. A valve 111 is placed on the inlet pipe 63 so that the live water or water supply from the mains or other source can be shut off from the valve testing apparatus each time that it is desired to remove the valve or other article that is being tested and place another one on the valve apparatus to be tested. The branch pipes 66 and 67 are constantly filled with water from the inlet pipe 63 and the pressure forces the valves 54 and 53 to open under normal conditions. When, however, water is admitted through the medium of the sliding piston valve 24 to either end of the low pressure cylinder, the pressure exerted against the high pressure cylinder it is working against is increased in the ratio of the difference in diameter between the high and low pressure cylinders. It will be observed that the pistons in the high pressure cylinder are forced against the pressure of the mains or other source of supply and against either of the valves 53 or 54 depending, of course, upon the direction the large piston is being forced and the pressure of the city water mains is increased in proportion to the difference in area of the large piston 9 and the small pistons 15 and 16 which increases the pressure to the same extent in the ports that communicate with that portion of the testing apparatus to which the valve or other article is secured for the purpose of testing. Both ends of the cylinders 7 and 8 are counterbored at $b$ and $c$ to release the water against either piston alternately, thereby permitting the water to leak around either piston and accelerate the opening of the valves 98 and 105 providing for a quick return action of the sliding piston valve and piston 9. Inlet apertures 93 and 100 are provided in the wall of the chamber 64. A push rod $d$ is fitted to an aperture in one end of the pipe 35 and is used for the purpose of shifting the sliding piston valve 24 off the center if necessary.

I am aware that hydraulic rams, motor pumps, automatic pumps, valves, etc., show devices operating upon the principle of my device to obtain different results and for different purposes, hence I do not claim the subject matter of the within application broadly when applied to other devices not used for testing purposes.

Having fully described my invention, what I claim and desire to secure by Letters Patent is:

1. In a testing apparatus for valves or the like, the combination of one low and two high pressure cylinders in axial alinement with each other, a casing, a sliding piston valve having an aperture formed in the central portion thereof fitted to said casing, two valves fitted to said aperture and adapted to permit and prevent the flow of fluid under pressure through said aperture, an inlet pipe, branch pipes connected to said inlet pipe and adapted to supply the high pressure cylinders with fluid under pressure, pipes connected to said branch pipes and said casing whereby fluid under pressure is permitted to flow into the casing to operate the sliding piston valve, valves and valve operating mechanism fitted to the pipes and adapted to control the fluid passing from the branch pipes to the casing for the purpose described.

2. In a testing apparatus, a low pressure cylinder, two high pressure cylinders, pistons fitted to said cylinders, a valve casing, a sliding valve fitted to reciprocate in said casing, and provided with two small valves fitted to each end thereof, said casing also having ports leading into each end of the low pressure cylinder, spring controlled valves secured to each end of the low pressure cylinder, an inlet pipe, branch pipes connected to said inlet pipe, elbow pipes connected to said branch pipes and each end of the low pressure cylinder, valves fitted within said elbow fittings and operated by the low pressure piston to permit live water to operate the sliding valve.

3. In an automatic testing apparatus for valves or the like, the combination of two high and one low pressure cylinder connected in axial alinement with each other, pistons fitted to reciprocate therein, an inlet supply pipe, branch pipes connected to said inlet pipe, elbow fittings connected to the high pressure cylinders and the branch pipes, a casing attached to the low pressure cylinder, a sliding piston valve fitted to said casing and adapted to alternately permit an inflow of fluid to each end of the low pressure cylinder, valves fitted to apertures in each end of said sliding piston valve and valves to regulate the flow of fluid through said fittings and pipes.

In testimony whereof I affix my signature in presence of two witnesses.

FRANK SCHREIDT.

Witnesses:
 JOHN H. COSS,
 PEARL ACKERMAN.

Copies of this patent may be obtained for five cents each, by addressing the "Commissioner of Patents, Washington, D. C."